United States Patent
Brokenshire et al.

(10) Patent No.: US 7,363,397 B2
(45) Date of Patent: Apr. 22, 2008

(54) SYSTEM AND METHOD FOR DMA CONTROLLER WITH MULTI-DIMENSIONAL LINE-WALKING FUNCTIONALITY

(75) Inventors: Daniel Alan Brokenshire, Round Rock, TX (US); Gordon Clyde Fossum, Austin, TX (US); Barry L Minor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 10/926,589

(22) Filed: Aug. 26, 2004

(65) Prior Publication Data

US 2006/0047864 A1    Mar. 2, 2006

(51) Int. Cl.
*G06F 13/12* (2006.01)
*G06F 13/10* (2006.01)

(52) U.S. Cl. .......................... 710/23; 710/22
(58) Field of Classification Search .................. 710/22, 710/23
See application file for complete search history.

(56) References Cited

U.S. PATENT DOCUMENTS

| | | | |
|---|---|---|---|
| 4,667,190 A * | 5/1987 | Fant ........................... | 345/568 |
| 4,754,267 A * | 6/1988 | Reynolds et al. ........... | 715/856 |
| 6,195,737 B1 * | 2/2001 | Hollister et al. ............ | 711/220 |
| 6,526,491 B2 | 2/2003 | Suzuoki et al. ............. | 711/164 |
| 6,529,196 B1 * | 3/2003 | Holt ............................ | 345/443 |
| 6,559,854 B2 | 5/2003 | Oka et al. ................... | 345/619 |
| 6,677,950 B1 * | 1/2004 | Ohba et al. ................. | 345/503 |
| 2001/0002130 A1 | 5/2001 | Suzuoki ....................... | 345/420 |
| 2002/0046229 A1 | 4/2002 | Yutaka et al. ............... | 709/102 |
| 2002/0060690 A1 | 5/2002 | Tanaka et al. ............... | 345/619 |
| 2002/0095523 A1 | 7/2002 | Shimakawa et al. ........ | 709/316 |
| 2002/0135582 A1 | 9/2002 | Suzuoki et al. ............. | 345/502 |
| 2002/0138637 A1 | 9/2002 | Suzuoki et al. ............. | 709/230 |
| 2002/0138701 A1 | 9/2002 | Suzuoki et al. ............. | 711/154 |
| 2002/0138707 A1 | 9/2002 | Suzuoki et al. ............. | 711/163 |
| 2002/0156993 A1 | 10/2002 | Suzuoki et al. ............. | 712/30 |
| 2003/0055984 A1 | 3/2003 | Shimakawa et al. ........ | 709/316 |
| 2003/0076331 A1 * | 4/2003 | Deering ...................... | 345/581 |

OTHER PUBLICATIONS

Foley et al., Computer Graphics: Principles and Practice, 1993, Second Edition, pp. 26 and 27.*

* cited by examiner

*Primary Examiner*—Henry Tsai
*Assistant Examiner*—Hyun Nam
(74) *Attorney, Agent, or Firm*—VanLeeuwen & VanLeeuwen; D'Ann N. Rifai

(57) ABSTRACT

A system and method for a DMA controller with multi-dimensional line-walking functionality is presented. A processor includes an intelligent DMA controller, which loads a line description that corresponds to a shape or line. The intelligent DMA controller moves through a memory map and retrieves data based upon the line description that includes a major step and a minor step. In turn, the intelligent DMA controller retrieves data from the shared memory without assistance from its corresponding processor. In one embodiment, the intelligent DMA controller may analyze a line using the rate of change along its minor axes in conjunction with locations where the line intersects subspaces and store array spans of contiguous memory along the line's major axis.

5 Claims, 7 Drawing Sheets

SYSTEM AND METHOD FOR DMA CONTROLLER WITH MULTI-DIMENSIONAL LINE-WALKING FUNCTIONALITY

BACKGROUND OF THE INVENTION

1. Technical Field

The present invention relates in general to a system and method for an intelligent Direct Memory Access (DMA) controller with multi-dimensional "line-walking" functionality. More particularly, the present invention relates to a system and method for including an intelligent DMA controller into a computer system such that the intelligent DMA controller is able to independently retrieve data from a multi-dimensional array based upon a line description.

2. Description of the Related Art

Computer systems are becoming increasingly complex. The computer industry continues a long-standing trend of doubling overall performance every eighteen months in electronic components such as personal computers, personal data assistants (PDAs) and game consoles. This trend continues primarily due to the semiconductor industry producing integrated circuits whose performance is twice that of predecessor circuits.

Current architectures implement DMA controllers that retrieve spans of contiguous address space from memory, or disparate lists of spans of contiguous address space from memory. The retrieved data is then loaded into storage locations more "local" to the support processor, whereby the support processor may access the data using fewer access cycles (e.g. a cache). A challenge found, however is that this approach requires a user to specify exact address locations of each of the spans from which to retrieve the data.

When a processor requires the retrieval of data from a multi-dimensional array in main memory whose addresses are derived from traversing a line in space, a challenge found is that the processor's DMA controller requires the processor to provide address locations as to where to retrieve data.

In addition, the computer industry is increasing performance by developing multi-processor architectures that typically include a main processor and one or more support processors. The main processor typically loads and executes an operating system that invokes application programs and, in turn, the application programs use the support processors to offload highly computational tasks. The support processors typically include a basic DMA controller that reads from and writes to main memory in order to perform the support processor's assigned task. A challenge found, however, in multi-processor environments is that a support processor may require assistance from a main processor to stage data in L2 cache from a shared memory such that the support processor's basic DMA controller retrieves data in its correct order.

What is needed, therefore, is a system and method to provide a processor with the ability for its DMA controller to retrieve data based upon a line description without burdening the processor.

SUMMARY

It has been discovered that the aforementioned challenges are resolved by including an intelligent DMA controller in a processor that directly interprets line description information and independently retrieves data from main memory that corresponds to the line description information. A processor includes an intelligent DMA controller that receives a memory location and dimensions of a multi-dimensional array, a description of a line (e.g two data points) that is included within the space of the multi-dimensional array, and a buffer address in the processor's local storage area. An intelligent DMA controller uses these inputs to retrieve data corresponding to the line description and the multi-dimensional array, and store the data in its local storage area that corresponds to the buffer address.

In one embodiment, in a single processor computer system, a software program within the processor may provide the line description to the intelligent DMA controller. For example, a processor may execute a terrain-rendering task whereby the terrain-rendering task includes a line description. In this example, the terrain-rendering task provides the line description to the DMA controller, which retrieves data from shared memory and stores the data in the support processor's local memory. In another embodiment, in a multi-processor computer system, a support processor may receive a line description from a main processor, whereby the support processor provides the line description to its intelligent DMA controller.

The intelligent DMA controller accesses a multi-dimensional array that represents a rectilinear grid of data points in space, whose memory locations include data corresponding to each of the data points in space. The intelligent DMA controller retrieves the data from main memory whose corresponding data point is "visited" by a line that is generated from a line description, and loads the data points in order of visitation into the local storage's specified buffer. In one embodiment, each data point may represent an entire square, cube, or hypercube. In this embodiment, if a line crosses the interior of the square, cube, or hypercube, the data point's corresponding data is retrieved.

Alternatively, the line description may include a major and one or more minor axis of the line, along with the size of a corresponding major step and one or more minor steps. A major step is that dimension whose unit vector yields the largest absolute value dot product with the line. For example, if the line travels through a two-dimensional memory map in a vertical direction more than it travels in a horizontal direction, the line's major step is along the vertical axis and the line's minor step is along the horizontal axis. Likewise, if the line travels through the two-dimensional memory map in a horizontal direction more than it travels in a vertical direction, the line's major step is along the horizontal axis and the line's minor step is along the vertical axis.

For each major-axis step, a corresponding location along each minor axis is computed, which is typically a number with integer and fractional components. The memory locations of interest are application dependent. For example, an application may use a single memory location at each major axis step, which is indexed by a truncated-to-integer value of the minor axis. In another example, an application may use points on one side of a major axis crossing point or a number of points on each side.

In one embodiment, a rule may specify, for each intersection between the line and a major-axis crossing, how large a neighborhood around the intersection point from which to collect data within the (n−1)-dimensional space of the major-axis crossing. For example, an intelligent DMA controller may collect a point's closest neighbor, the point's closest four neighbors, or a neighbor on a particular side of the point.

In addition, the intelligent DMA controller may receive a rule that specifies the behavior of the DMA controller if a line travels outside the boundaries of a multi-dimensional array. For example, the rule may instruct the intelligent DMA controller to 1) stop collecting data as soon as the line goes out of bounds, or 2) continue collecting data from memory locations outside the bounds of the array.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
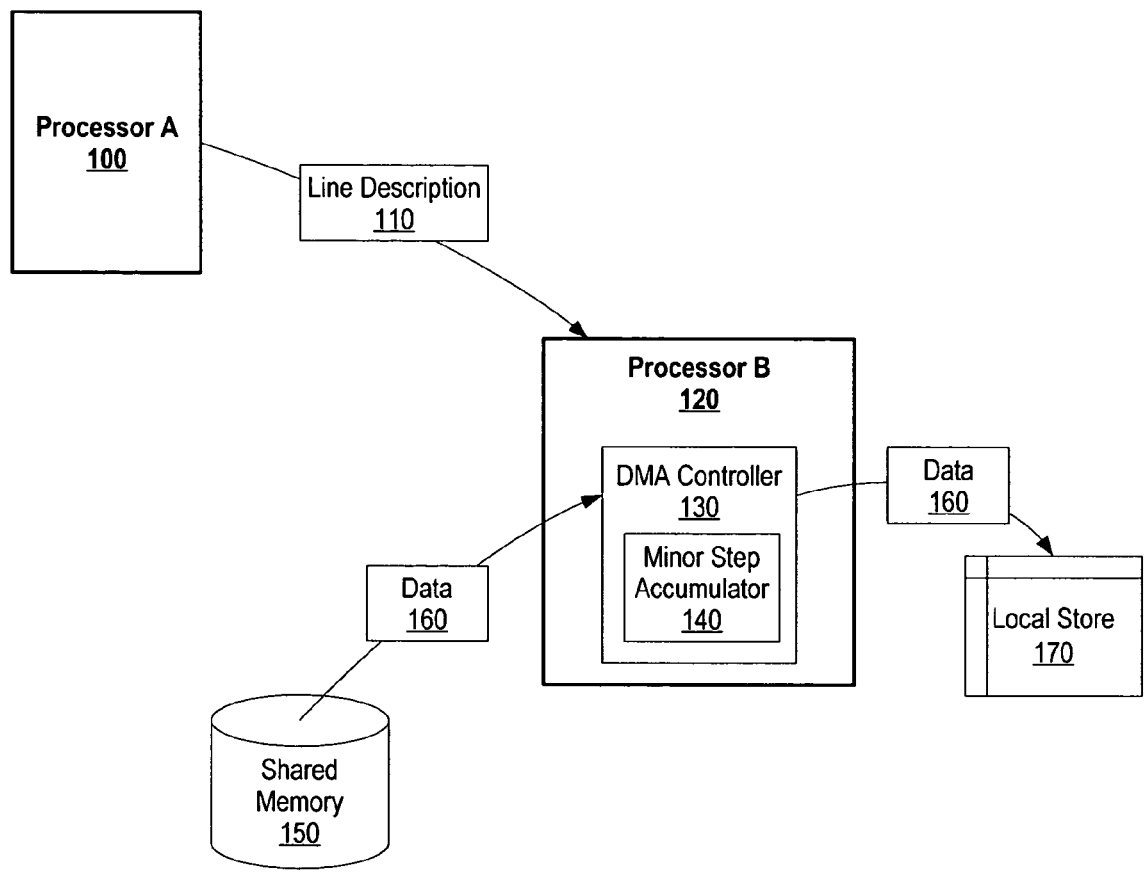
FIG. 1 is a diagram showing a support processor's DMA controller using a line description to retrieve data from particular memory locations.

FIG. 1 is a diagram showing a support processor's DMA controller using a line description to retrieve data from particular memory locations. The computer system shown in FIG. 1 includes a main processor (i.e. processor A 100) and a support processor, such as processor B 120. Processor B 120 includes programmable DMA controller 130, which is capable of receiving a line description that describes a shape or a line, and stepping through a two-dimensional memory map based upon the line description. In turn, the DMA controller provides data to processor B 120 and, therefore, processor B 120 does not request the main processor to stage the data in an L2 cache for processor B 120 to retrieve.

Processor A 100 sends line description 110 to processor B 120. Line description 110 describes a line and may include a major step and one or more minor steps in which DMA controller 130 uses to step through a multi-dimensional memory map. For example, line description 110 may include two data points in which DMA controller 130 uses to "walk a line" and retrieve corresponding data from shared memory. The orientation of a line's major step and minor steps are dependent upon the angle of the line. For example, if the line travels through a two-dimensional memory map in a vertical direction more than it does in a horizontal direction, the line's major step is along the vertical axis and the line's minor step is along the horizontal axis. Likewise, if the line travels through the two-dimensional memory map in a horizontal direction more than it does in a vertical direction, the line's major step is along the horizontal axis and the lines minor step is along the vertical axis (see FIGS. 2A, 2B, and corresponding text for further details regarding major step and minor step orientation).

Processor B 120 receives line description 110, and loads the line description in DMA controller 130. DMA controller 130 identifies a major step and one or more minor step starting memory locations that corresponds to the line description, and retrieves data 160 from shared memory 150 at the starting memory location. DMA controller 130 stores data 160 in local store 170, which is processor B 120's dedicated memory. DMA controller 130 increments the major step location, and increases the minor step locations based upon the line description. For example, if the starting memory location is "0 major, 0 minor" and the line description is such that its corresponding line travels four major steps for every one minor step, the next location is "1 major, 0.25 minor." In this example, since 0.25 is not a valid memory location, DMA controller 130 retrieves data from "1 major, 0 minor" and increments a minor step count within minor step accumulator 140 by 0.25. When the one of the minor step counts reaches "1," DMA controller 130 increments the minor step location, and retrieves data from the incremented minor step location. Using the example described above, DMA controller 130 retrieves data from locations "0,0", "1,0", "2,0", "3,0", "4,1", etc. (see FIG. 4 and corresponding text for further details regarding minor step incrementation).

DMA controller 130 continues to retrieve data 160 from shared memory 150 and stores the data in local store 170 until DMA controller 130 reaches a user specified major step limit or it reaches the end of the memory map. A user is able to specify how many major step data points that a DMA controller should collect. For example, in a terrain-rendering scenario, a user may instruct DMA controller 130 to collect two thousand major step data points because the image is "cloudy" after two thousand major step data points. Once DMA controller 130 finishes data collection, processor B 120 retrieves the data from local store 170 and renders an image.

In one embodiment, a computer system includes a main processor and a plurality of support processors. In this embodiment, each of the plurality of support processors includes an intelligent DMA controller whereby each of the DMA controllers is able to independently retrieve data from a shared memory location in order to provide the data to their respective support processors.

In another embodiment, a software program within the support processor may provide the line description to the DMA controller. For example, a support processor may execute a terrain-rendering task whereby the terrain-rendering task includes a line description. In this example, the terrain-rendering task provides the line description to the DMA controller, which retrieves data from shared memory and stores the data in local memory. In turn, the terrain-rendering task uses the data in local memory in order to complete its task.

Figure 2A:
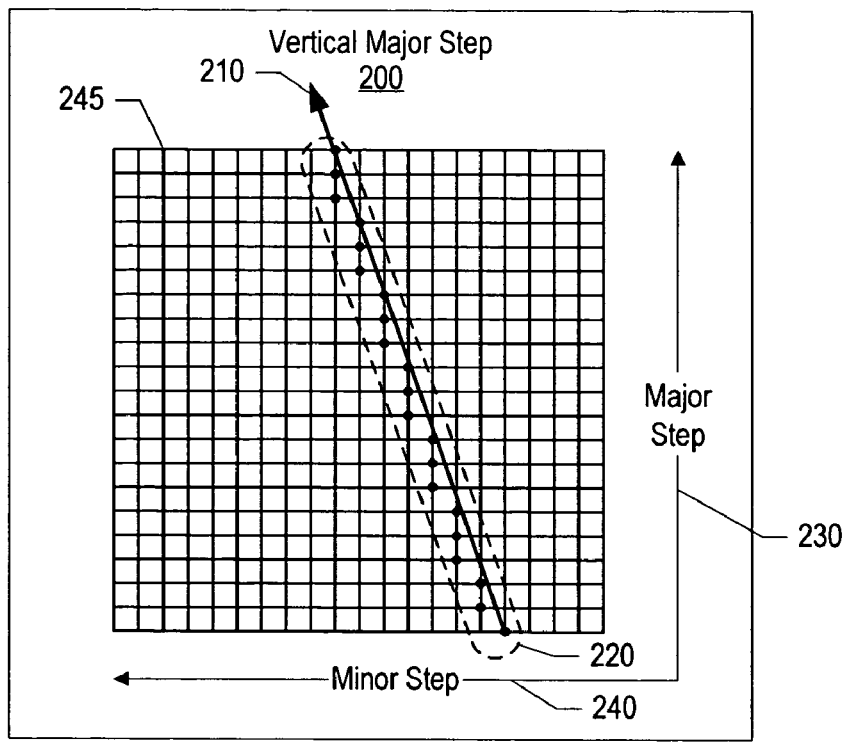
FIG. 2A is a diagram showing data that is collected based upon a line whose major step is in a vertical direction.

FIG. 2A is a diagram showing data that is collected based upon a line whose major step is in a vertical direction. The orientation of a line's major step and minor step are dependent upon the angle of the line. For each major-axis step, a corresponding location along the minor axis is computed, which is typically a fractional value. The memory locations of interest are application dependent. In one embodiment, an application may use a single memory location at each major axis step, which is indexed by a truncated-to-integer value of the minor axis. In another embodiment, an application may use points on one side of a major axis crossing point or a number of points on each side.

Vertical major step 200 shows that line 210 travels along a vertical direction more than it does in a horizontal direction. Therefore, line 210's major step is along the vertical axis (i.e. axis 230) and the lines minor step is along the horizontal axis (i.e. axis 240). During data collection, a DMA controller collects data from memory map 240 along line 210 that corresponds to a line description. Dotted memory points 220 show that the DMA controller collects data at particular memory locations that correspond to line 210. The DMA controller continues to collect data along line 210 up until the DMA controller reaches the end of memory map 245 or until the DMA controller reaches a user specified major step limit. A user may specify how many major step data points that a DMA controller collects in order to increase data collection throughput.

Figure 2B:
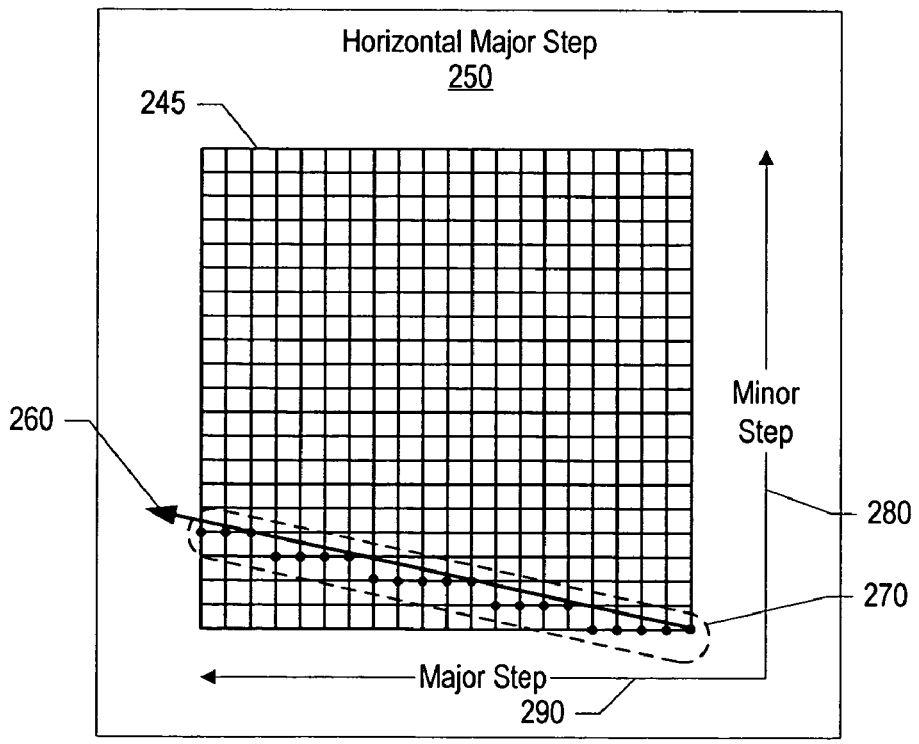
FIG. 2B is a diagram showing data that is collected based upon a line whose major step is in a horizontal direction.

When a line's orientation travels along a horizontal direction more than it travels in a vertical direction, the line's major step is along the horizontal axis and the line's minor step is along the vertical axis (see FIGS. 2B and corresponding text for further details regarding horizontal major steps).

FIG. 2B is a diagram showing data that is collected based upon a line whose major step is in a horizontal direction. FIG. 2B is similar to FIG. 2A except that line 260 travels in a horizontal direction more than it travels in a vertical direction. As such, line 260's major step is along the horizontal axis (i.e. axis 290) and the line's minor step is along the vertical axis (i.e. axis 280).

Dotted memory points 270 show that the DMA controller collects data at particular memory locations that correspond to line 260. The DMA controller continues to collect data along line 260 until the DMA controller reaches the end of memory map 245 or until the DMA controller reaches a user specified major step limit.

Figure 3:
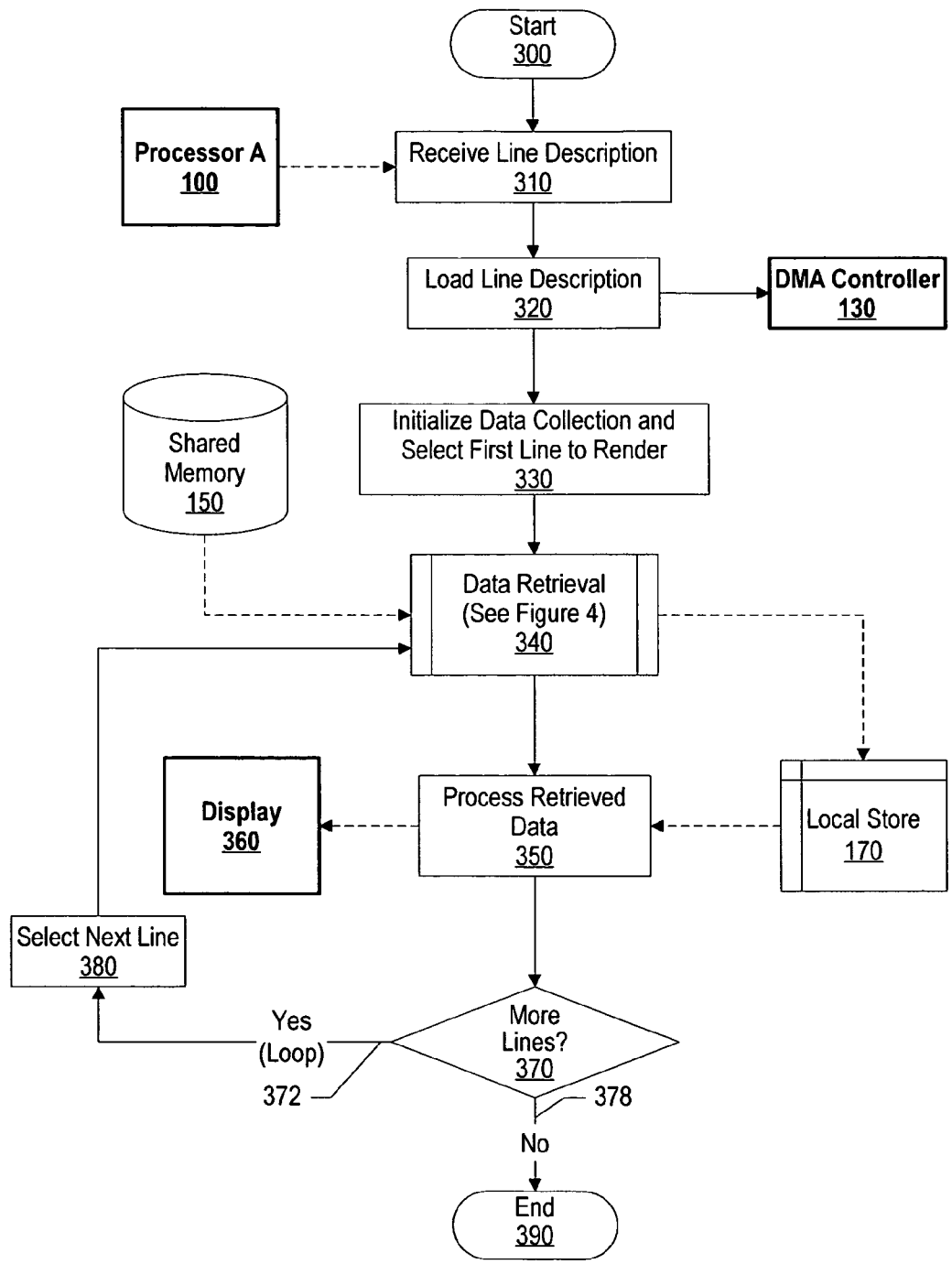
FIG. 3 is a flowchart showing steps taken in loading a line description into a DMA controller whereby the DMA controller retrieves data from a shared memory location based upon the line description.

FIG. 3 is flowchart showing steps taken in loading a line description into a DMA controller whereby the DMA controller retrieves data from a shared memory location based upon the line description. A support processor includes an intelligent DMA controller that receives a line description from a main processor, such as processor A 100, retrieves data from shared memory based upon the line description, and stores the data in the support processor's dedicated memory.

Processing commences at 300, whereupon the support processor retrieves a line description from processor A 100 at step 310. Processor A 100 is the same as that shown in FIG. 1, and may be heterogeneous to the support processor. For example, processor A 100 may be a microprocessor-based processor and the support processor may be a digital signal-based processor. The support processor loads the retrieved line description in its DMA controller, such as DMA controller 130, at step 320. DMA controller 130 is the same as that shown in FIG. 1, and is capable of stepping through a two-dimensional memory map using the line description (see FIG. 4 and corresponding text for further details regarding data retrieval).

The support processor initializes a data collection process and selects a first line in which to retrieve data at step 330. For example, the support processor may use DMA controller 130 to retrieve data corresponding to multiple lines, and the support processor uses the data to render an image on a computer screen. The support processor's DMA controller (i.e. DMA controller 130) retrieves data from locations in shared memory 150 based upon major and minor steps that correspond to the line description, and loads the retrieved data in local store 170, which is the support processor's dedicated memory (pre-defined process block 340, see FIG. 4 and corresponding text for further details). Shared memory 150 and local store 170 are the same as that shown in FIG. 1.

At step 350, the support processor retrieves the data from local store 170 and renders an image on display 360. For example, the support processor may use the data to compute terrain image values for a gaming application.

A determination is made as to whether there are more lines for the support processor to retrieve data (decision 370). If there are more lines in which to retrieve corresponding data, decision 370 branches to "Yes" branch 372 which loops back to select (step 380) and process the next line. This looping continues until there are no more lines in which to retrieve corresponding data, at which point decision 370 branches to "No" branch 378 whereupon processing ends at 390.

In one embodiment, a software program within the support processor may provide the line description to the DMA controller. For example, a support processor may execute a terrain-rendering task whereby the terrain-rendering task includes a line description. In this example, the terrain-rendering task provides the line description to the DMA controller, which retrieves data from shared memory and stores the data in local memory. In turn, the terrain-rendering task uses the data in local memory in order to complete its task.

Figure 4:
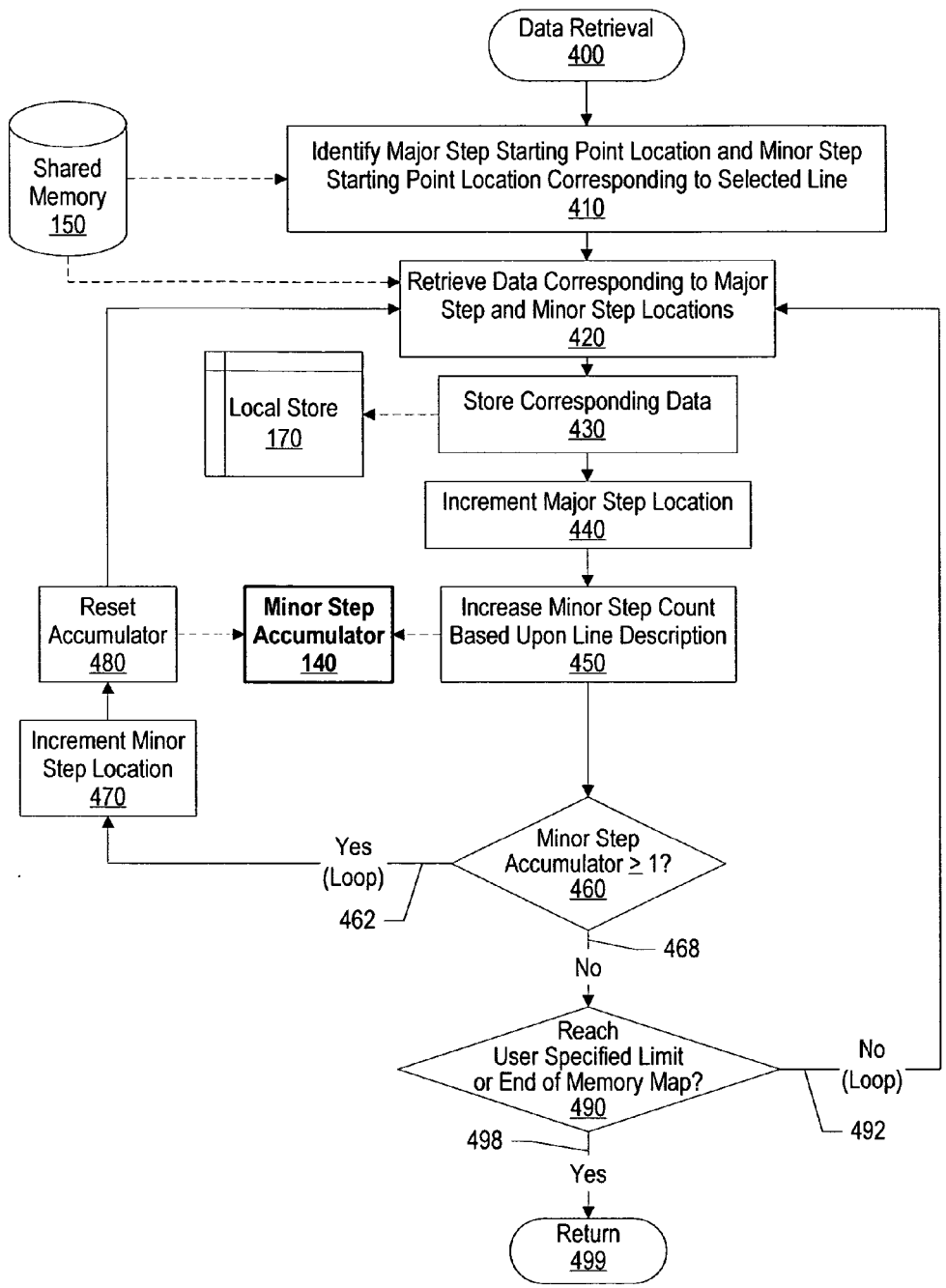
FIG. 4 is a flowchart showing steps taken in a DMA controller retrieving data from particular memory locations that correspond to a line description.

FIG. 4 is a flowchart showing steps taken in a DMA controller retrieving data from particular memory locations that correspond to a line description. A computer system includes a main processor and one or more support processors. Each support processor includes an intelligent DMA controller, which allows each support processor to retrieve data from a shared memory location without requesting assistance from the main processor.

Data retrieving processing commences at 400, whereupon processing identifies a major step starting point location and a minor step starting point location in shared memory 150 that corresponds to a selected line. The orientation of a line's major step and minor step are dependent upon the angle of the line. For example, if the line is in a more vertical direction than a horizontal direction, the line's major step is along the vertical axis and the line's minor step is along the horizontal axis. Likewise, if the line is in a more horizontal direction than a vertical direction, the line's major step is along the horizontal axis and the line's minor step is along the vertical axis (see FIGS. 2A, 2B, and corresponding text for further details regarding major steps and minor steps).

The DMA controller retrieves data from the shared memory location that corresponds to the major step starting point and the minor step starting point at step 420. At step 430, the DMA controller stores the retrieved data in local store 170. Local store 170 is the same as that shown in FIG. 1, and is the support processors dedicated memory, or internal memory. The DMA controller increments the major step memory location at step 440. At step 450, the DMA controller increases a minor step count in minor step accumulator 140 that is based upon the line description. For example, if the line description is such that the line travels in four major steps for every one minor step, the DMA controller increments minor step accumulator 140 by 0.25.

A determination is made as to whether the minor step accumulator has reached "1" (decision 460). If the minor step accumulator as reached "1", decision 460 branches to "Yes" branch 462 which loops back to increment the minor step location (step 470), reset minor step accumulator 140 (step 480), and retrieve data that corresponds to the incremented major step and incremented minor step.

On the other hand, if the minor step count has not reached "1", decision 460 branches to "No" branch 468 whereupon a determination is made as to whether the DMA controller has reached a user specified major step limit or whether the DMA controller has reached the end of the memory map (decision 490). A user is able to specify how many major step data points that a DMA controller should collect in order to increase data collection throughput. For example, in a terrain-rendering scenario, a user may instruct the DMA controller to collect two thousand major step data points because the image is "foggy" after two thousand major step data points.

If the DMA controller has not reached a user specified major step limit or the end of the memory map, decision 490 branches to "No" branch 492 which loops back to retrieve data that corresponds to the incremented major step. This looping continues until the DMA controller reaches a user specified major step limit or the DMA controller reaches the end of the memory map, at which point decision 490 branches to "Yes" branch 498 whereupon processing returns at 499.

Figure 5:
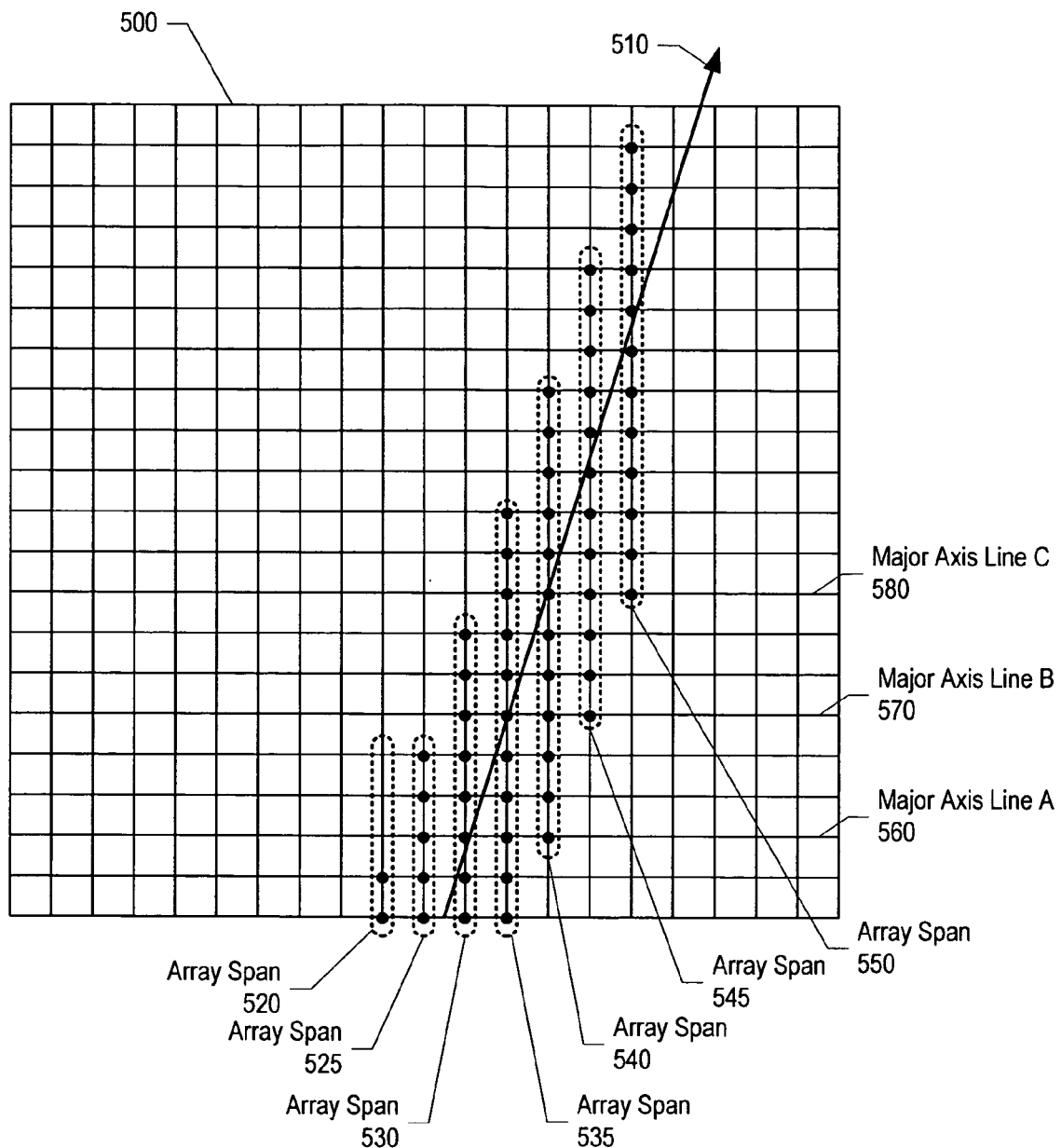
FIG. 5 is a diagram showing contiguous memory location array spans that correspond to a line.

FIG. 5 is a diagram showing contiguous memory location array spans that correspond to a line. Line 510 travels along memory map 500 whereby line 510's major step is in a vertical direction and line 510's minor step is in a horizontal direction. Depending on an application implementation, a user may choose to specify a memory point neighbor quantity in order to analyze a line using the rate of change along its minor axes in conjunction with the locations where the line intersects subspaces, and store computed spans of contiguous memory along the line's major axis.

The example in FIG. 5 shows an implementation of retrieving the closest four memory point neighbors at each major-axis step. In this example, a computation is based upon the number of desired memory point neighbors (e.g. four neighbors) and the slope of the line. Therefore, the programmable DMA controller loads up to twelve contiguous addresses in each span to ensure that the appropriate neighbors are captured.

As line 510 starts to travel along memory map 500, the programmable DMA controller loads array spans 520 through 535 based upon the starting point and direction traversal of line 510. Array spans 520 through 535 provide four non-contiguous memory points to correspond with line 510's starting point, and also provide four non-contiguous memory points up until line 510 reaches major axis line A 560, whereupon line 510 crosses a minor axis line. At this point, the programmable DMA controller loads array span 540 in order to provide four non-contiguous memory points.

As line 510 travels through memory map 500, the programmable DMA controller continues to load array spans at instances where line 510 crosses a minor axis line. FIG. 5 shows that the programmable DMA controller loads array span 545 when line 510 reaches major axis line B 570, and the programmable DMA controller loads array span 550 when line 510 reaches major axis line C 580. By loading array spans, memory sub-system performance is improved with minimal start-up inefficiency.

Figure 6:
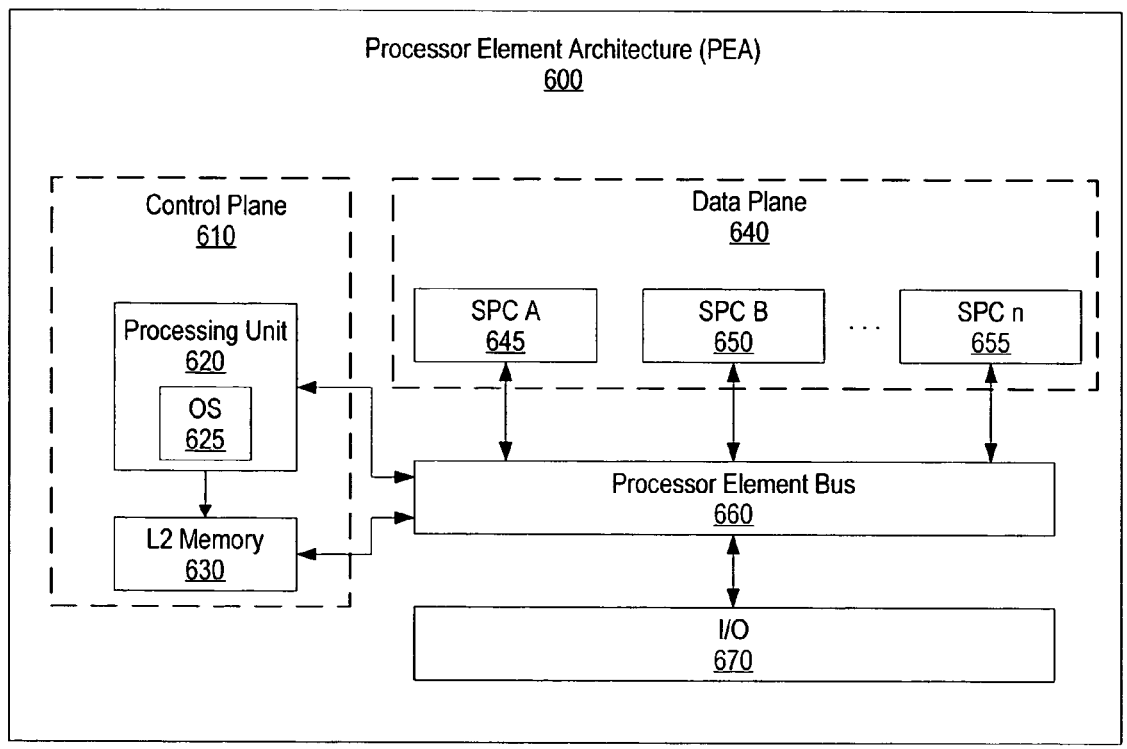
FIG. 6 is a diagram showing a processor element architecture that includes a plurality of heterogeneous processors.

FIG. 6 is a diagram showing a processor element architecture that includes a plurality of heterogeneous processors. The heterogeneous processors share a common memory and a common bus. Processor element architecture (PEA) 600 sends and receives information to/from external devices through input output 670, and distributes the information to control plane 610 and data plane 640 using processor element bus 660. Control plane 610 manages PEA 600 and distributes work to data plane 640.

Control plane 610 includes processing unit 620 which runs operating system (OS) 625. For example, processing unit 620 may be a Power PC core that is embedded in PEA 600 and OS 625 may be a Linux operating system. Processing unit 620 manages a common memory map table for PEA 600. The memory map table corresponds to memory locations included in PEA 600, such as L2 memory 630 as well as non-private memory included in data plane 640 (see FIG. 7A, 7B, and corresponding text for further details regarding memory mapping).

Data plane 640 includes Synergistic Processing Complex's (SPC) 645, 650, and 655. Each SPC is used to process data information and each SPC may have different instruction sets. For example, PEA 600 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU) which is a processing core, such as a digital signal processor, a microcontroller, a microprocessor, or a combination of these cores.

SPC 645, 650, and 655 are connected to processor element bus 660 which passes information between control plane 610, data plane 640, and input/output 670. Bus 660 is an on-chip coherent multi-processor bus that passes information between I/O 670, control plane 610, and data plane 640. Input/output 670 includes flexible input-output logic which dynamically assigns interface pins to input output controllers based upon peripheral devices that are connected to PEA 600. For example, PEA 600 may be connected to two peripheral devices, such as peripheral A and peripheral B, whereby each peripheral connects to a particular number of input and output pins on PEA 600. In this example, the flexible input-output logic is configured to route PEA 600's external input and output pins that are connected to peripheral A to a first input output controller (i.e. IOC A) and route PEA 600's external input and output pins that are connected to peripheral B to a second input output controller (i.e. IOC B).

Figure 7A:
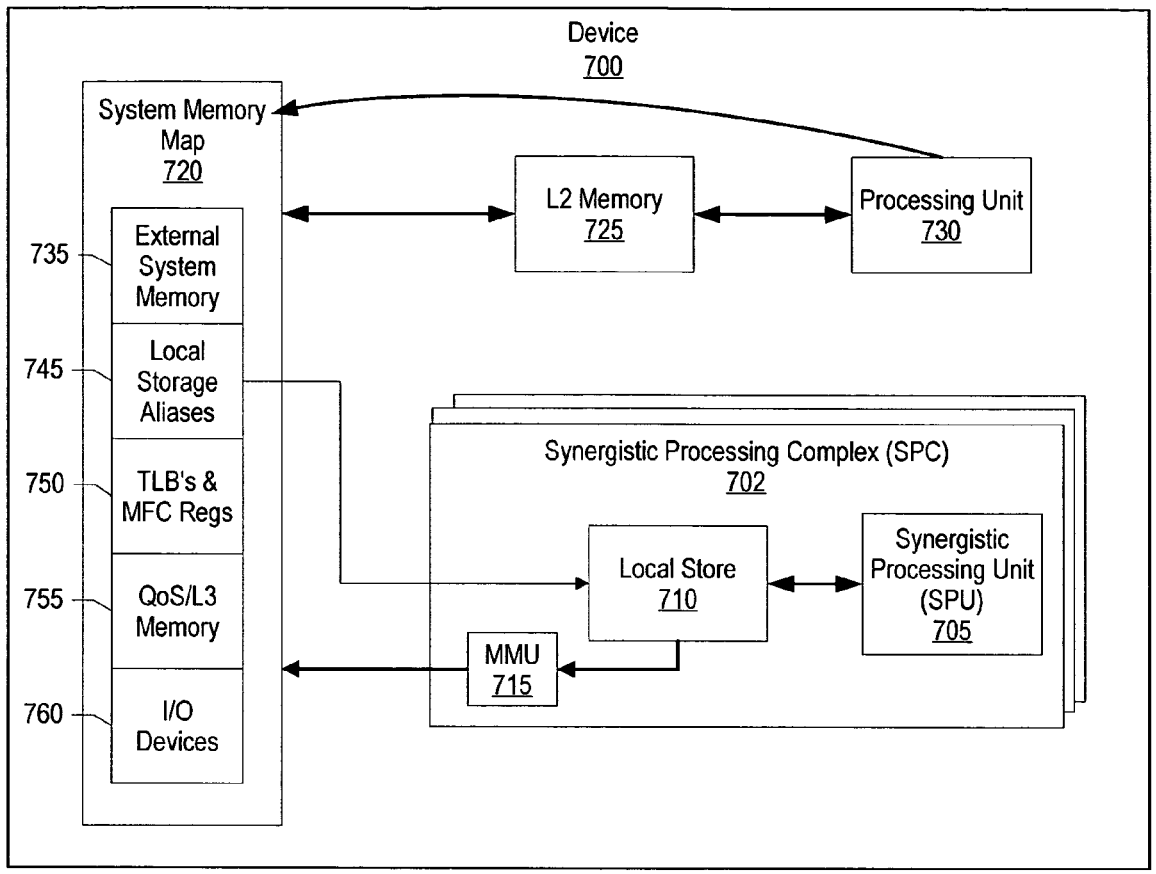
FIG. 7A illustrates an information handling system which is a simplified example of a computer system capable of performing the computing operations described herein.

FIG. 7A illustrates an information handling system which is a simplified example of a computer system capable of performing the computing operations described herein. The example in FIG. 7A shows a plurality of heterogeneous processors using a common memory map in order to share memory between the heterogeneous processors. Device 700 includes processing unit 730 which executes an operating system for device 700. Processing unit 730 is similar to processing unit 620 shown in FIG. 6. Processing unit 730 uses system memory map 720 to allocate memory space throughout device 700. For example, processing unit 730 uses system memory map 720 to identify and allocate memory areas when processing unit 730 receives a memory request. Processing unit 730 access L2 memory 725 for retrieving application and data information. L2 memory 725 is similar to L2 memory 630 shown in FIG. 6.

System memory map 720 separates memory mapping areas into regions which are regions 735, 745, 750, 755, and 760. Region 735 is a mapping region for external system memory which may be controlled by a separate input output device. Region 745 is a mapping region for non-private storage locations corresponding to one or more synergistic processing complexes, such as SPC 702. SPC 702 is similar to the SPC's shown in FIG. 6, such as SPC A 645. SPC 702 includes local memory, such as local store 710, whereby portions of the local memory may be allocated to the overall system memory for other processors to access. For example, 1 MB of local store 710 may be allocated to non-private storage whereby it becomes accessible by other heterogeneous processors. In this example, local storage aliases 745 manages the 1 MB of nonprivate storage located in local store 710.

Region 750 is a mapping region for translation lookaside buffer's (TLB's) and memory flow control (MFC registers. A translation lookaside buffer includes cross-references between virtual address and real addresses of recently referenced pages of memory. The memory flow control provides interface functions between the processor and the bus such as DMA control and synchronization.

Region 755 is a mapping region for the operating system and is pinned system memory with bandwidth and latency guarantees. Region 760 is a mapping region for input output devices that are external to device 700 and are defined by system and input output architectures.

Synergistic processing complex (SPC) 702 includes synergistic processing unit (SPU) 705, local store 710, and memory management unit (MMU) 715. Processing unit 730 manages SPU 705 and processes data in response to processing unit 730's direction. For example SPU 705 may be a digital signaling processing core, a microprocessor core, a micro controller core, or a combination of these cores. Local store 710 is a storage area that SPU 705 configures for a private storage area and a non-private storage area. For example, if SPU 705 requires a substantial amount of local memory, SPU 705 may allocate 100% of local store 710 to private memory. In another example, if SPU 705 requires a minimal amount of local memory, SPU 705 may allocate 10% of local store 710 to private memory and allocate the remaining 90% of local store 710 to non-private memory (see FIG. 7B and corresponding text for further details regarding local store configuration).

The portions of local store 710 that are allocated to non-private memory are managed by system memory map 720 in region 745. These non-private memory regions may be accessed by other SPU's or by processing unit 730. MMU 715 includes a direct memory access (DMA) function and passes information from local store 710 to other memory locations within device 700.

Figure 7B:
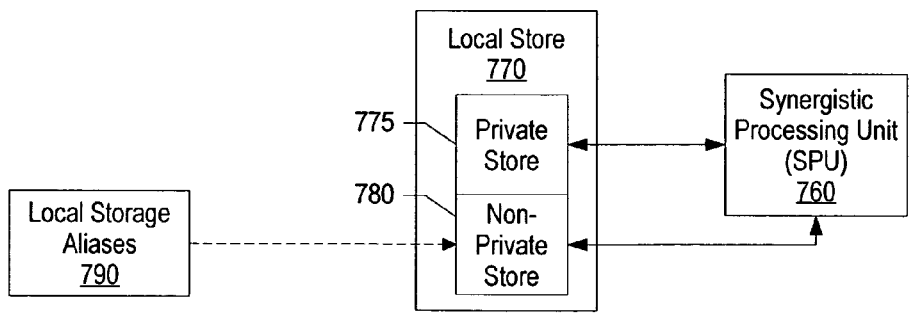
FIG. 7B is a diagram showing a local storage area divided into private memory and non-private memory.

FIG. 7B is a diagram showing a local storage area divided into private memory and non-private memory. During system boot, synergistic processing unit (SPU) 760 partitions local store 770 into two regions which are private store 775 and non-private store 780. SPU 760 is similar to SPU 705 and local store 770 is similar to local store 710 that are shown in FIG. 7A. Private store 775 is accessible by SPU 760 whereas non-private store 780 is accessible by SPU 760 as well as other processing units within a particular device. SPU 760 uses private store 775 for fast access to data. For example, SPU 760 may be responsible for complex computations that require SPU 760 to quickly access extensive amounts of data that is stored in memory. In this example, SPU 760 may allocate 100% of local store 770 to private store 775 in order to ensure that SPU 760 has enough local memory to access. In another example, SPU 760 may not require a large amount of local memory and therefore, may allocate 10% of local store 770 to private store 775 and allocate the remaining 90% of local store 770 to non-private store 780.

A system memory mapping region, such as local storage aliases 790, manages portions of local store 770 that are allocated to non-private storage. Local storage aliases 790 is similar to local storage aliases 745 that is shown in FIG. 7A. Local storage aliases 790 manages non-private storage for each SPU and allows other SPU's to access the non-private storage as well as a device's control processing unit.

While the computer system described in FIGS. 6, 7A, and 7B are capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:

receiving a line description;

loading the line description into a DMA controller that is located on a processor, the DMA controller including a minor step accumulator;

identifying, within the DMA controller, a major step orientation and a minor step orientation using the line description:

wherein the minor step orientation is horizontal when the line description corresponds to a line that travels in a vertically prominent direction;

wherein the minor step orientation is vertical when the line description corresponds to a line that travels in a horizontally prominent direction; and wherein a major step is a value that corresponds to the major step orientation and a minor step is a value that corresponds to the minor step orientation, the major step and the minor step used to identify locations in a main memory area from which to retrieve data;

retrieving data from the main memory area based on the major step and the minor step using the DMA controller;

providing the retrieved data to the processor through a local memory store included with the processor;

after providing the retrieved data to the processor, updating the major step using the DMA controller based upon the line description;

after providing the retrieved data to the processor, revising a minor step count within the minor step accumulator based upon the line description;

determining whether the revised minor step count crosses an integer boundary;

updating the minor step in response to determining that the revised minor step count crossed the integer boundary;

using the undated minor step and the undated major step to retrieve subsequent data from the main memory area; and providing retrieved subsequent data to the processor through the local memory store included with the processor.

2. The method of claim 1 further comprising:

determining whether a user specified limit has not been reached that corresponds to the major step; and performing the retrieving in response to determining that the user specified limit has not been reached.

3. The method of claim 1 further comprising:

retrieving a memory point neighbor quantity; and determining a number of array spans to retrieve based upon the memory point neighbor quantity, whereby the data is segmented into each of the number of array spans.

4. The method of claim 1 wherein the main memory area is shared memory, the shared memory mapped to the processor and one or more other processors using a common memory map, wherein the line description is sent from one of the other processors which is heterogeneous to the processor.

5. The method of claim 1 wherein the line description includes two data points that exist in shared memory.

* * * * *